Patented Aug. 16, 1932

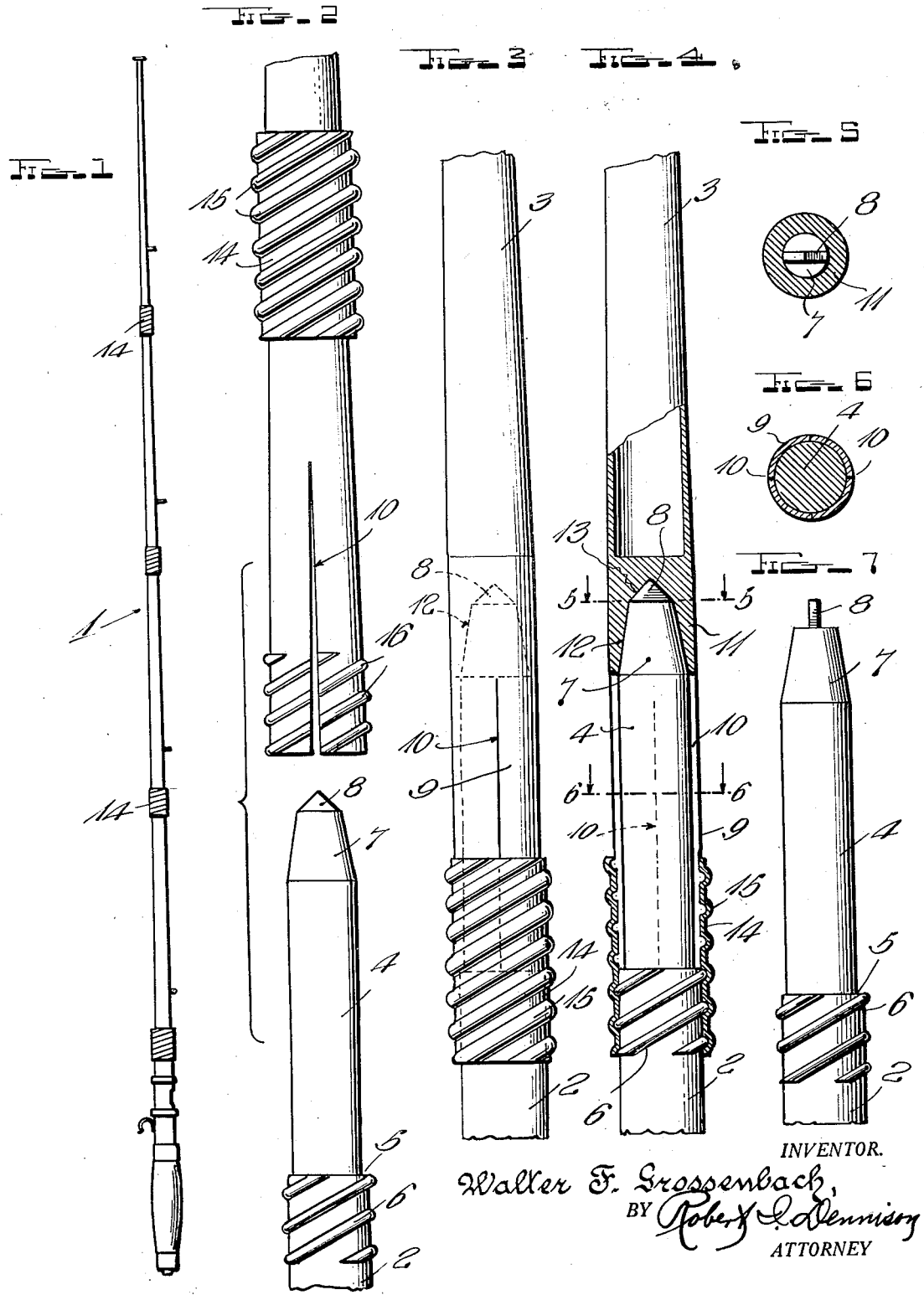

1,871,985

UNITED STATES PATENT OFFICE

WALTER F. GROSSENBACH, OF OGDEN, UTAH

FISHING ROD FERRULE

Application filed June 3, 1931. Serial No. 541,907.

The present invention relates to improvements in rod joints and couplings and has reference more particularly to a fishing rod ferrule construction.

One of the important objects of the present invention is to provide a fishing rod ferrule for connecting the adjacent or abutting ends of the sections of a fishing rod in such a manner as to prevent the sticking together of the ferrules, thus preventing the ferrules from becoming disassociated with the ends of the respective rod sections and also preventing the sections of the rod from twisting and becoming broken.

A still further and important object is to provide a fishing rod ferrule of the above mentioned character wherein co-acting means is provided between the adjacent ends of the rod sections to prevent relative rotative movement of the sections with respect to each other.

Still a further and important object is to provide a fishing rod ferrule of the above mentioned character that includes a locking sleeve for holding the inter-fitting ends of the sections of the rod in assembled relation, the parts being so arranged as to permit the same to be readily and easily assembled or disassembled.

A still further object is to provide a fishing rod ferrule of the above mentioned character which will not lessen the strength of the connection between the adjacent ends of the rod sections nor impair the flexibility of the rod.

A further salient object is to provide a fishing rod ferrule of the above mentioned character which is simple in construction, inexpensive, strong and durable and further well adapted to the purposes for which it is designed.

Other objects and advantages of the present invention will become apparent when taken in connection with the accompanying drawing.

In the drawing, wherein like references designate corresponding parts throughout the several views:

Figure 1 is an elevational view of a sectional fishing rod showing my improved ferrule construction associated therewith;

Figure 2 is an enlarged fragmentary elevational view of the adjacent ends of a pair of sections of the fishing rod before the same are assembled together, the locking sleeve being shown in raised or inoperative position;

Figure 3 is a similar view showing the parts assembled and the locking sleeve in its lowered operative position;

Figure 4 is a view similar to Figure 3 with parts shown in section and more clearly illustrating the flat pointed lug fitted in the complementary socket for preventing rotation of one rod section with respect to the other;

Figure 5 is a sectional view taken approximately on the line 5—5 of Figure 4 looking downwardly;

Figure 6 is a similar transverse section taken substantially on the line 6—6 of Figure 4, also looking downwardly; and Figure 7 is an elevational view of one rod section showing the flat pointed key or lug formed on its upper tapered end.

In the drawing, wherein for the purpose of illustration is shown the preferred embodiment of my invention, the numeral 1 designates generally a sectional fishing rod that comprises any suitable number of rod sections that are assembled together and held in such manner by my improved ferrule construction, the details of which will be hereinafter more specifically described.

For the purpose of the present invention, but two sections will be sufficient, one section being designated by the numeral 2 while the other section in designated by the numeral 3. The upper end of the lower section 2 is reduced as indicated at 4 to form a shoulder 5 at the juncture of the reduced portion 4 with the remaining portion of the rod section 2 and as is clearly illustrated in Figures 2, 4 and 7 of the drawing, spiral ridges 6 are formed on the rod section 2 adjacent the reduced portion 4, the purpose of which will be hereinafter more fully explained.

The upper extremity of the reduced portion 4 is slightly tapered as indicated at 7 and formed on the upper end of this reduced portion 4 is the flat and pointed key or lug 8, the purpose of which will also be presently described.

Associated with the lower end of the complementary upper rod section 3 is the split tubular member 9. This tubular member is formed with diametrically opposed slits 10 that extend inwardly from the outer end of the tubular member to the solid portion 11 of the rod section 3, the slits 10 afford a means whereby the tubular member 9 will be slightly tapered.

The solid portion 11 is formed with a tapered socket 12 for the reception of the tapered upper end 7 of the rod section 2 and the inner end of this socket 12 is formed with a recess 13 shaped to receive the flat pointed key or lug 8 whereby when the lug or key 8 is fitted in the recess 13, the sections 2 and 3 will be locked against rotation with respect to each other.

Also forming a salient part of the present invention is the slightly tapered locking sleeve 14 that is slidable along the upper rod section 3 and the tubular member 9 and this locking sleeve is internally threaded as indicated at 15.

The lower end of the slit tubular member 9 is also formed with spiral ridges 16 similar to the spiral ridges 6 formed on the lower rod section 2 and the ridges 6 and 16 cooperate to form external threads for interlocking engagement with the internal threads 15 of the locking sleeve 14 when said locking sleeve is moved downwardly on the tubular member 9 and brought into engagement with the ridges 6 and 16 in the manner as shown more clearly in Figures 3 and 4 of the drawing.

In assembling the sections of the fishing rod together, the reduced portion 4 of the lower section 2 will be disposed within the slit tubular member 9 of the superjacent rod section 3 with the tapered portion 7 fitting in the tapered socket 12 and the key or lug 8 having locking engagement with the recess 13. The lower end of the split tubular member 9 will be disposed adjacent the shoulder 5 and when the locking sleeve 14 is moved downwardly to the position shown in Figures 3 and 4, said locking sleeve will compress the split tubular member 9 and tightly secure said member around the reduced portion 4 of the rod section 2 and the threads 15 of the locking sleeve will engage with the ridges 6 and 16 to positively hold the sections of the fishing rod together in assembled relation.

A ferrule construction of this character will not stick and will furthermore prevent breaking of the sections of the rod when assembling and dissembling as well as tending to prevent the twisting of the rod sections and this without affecting the flexibility of the fishing rod. Furthermore, due to its simplicity, the parts comprising my fishing rod ferrule can be readily and easily assembled or disassembled and will at all times be positive and efficient in carrying out the purposes for which it is designed.

While I have shown the preferred embodiment of the invention, it is to be understood that minor changes may be made in the size, shape and arrangement of parts without departing from the spirit of the invention and the scope of the appended claims.

Having thus described my invention, what I claim is:

1. In a joint for the adjacent ends of a pair of rods wherein the end of one rod is reduced forming a shoulder on the rod, a split tubular member carried by the end of the adjacent rod and into which the reduced portion of the first mentioned rod is adapted to fit so that one end of the split tubular member abuts the shoulder, eternal threads formed on the end of the split tubular member and on the first mentioned rod adjacent said shoulder and the reduced portion and an internally threaded locking sleeve slidably arranged on the rod carrying said tubular split member, the locking sleeve adapted to engage the eternal threads of the tubular member and the first mentioned rod to secure the rods together in assembled relation, the split tubular member being compressed by said internally threaded sleeve around the aforementioned reduced portion.

2. In a joint for the adjacent ends of a pair of rods, wherein the end of one rod is reduced forming a shoulder on the rod, a split tubular member carried by the end of the adjacent rod and into which the reduced portion of the first mentioned rod is adapted to fit so that one end of the split tubular member abuts the shoulder, external threads formed on the end of the split tubular member and on the first mentioned rod adjacent said shoulder and the reduced portion and an internally threaded locking sleeve slidably arranged on the rod carrying said tubular split member, the locking sleeve adapted to engage the eternal threads of the tubular member and the first mentioned rod to secure the rods together in assembled relation, the split tubular member being compressed by said internally threaded sleeve around the aforementioned reduced portion and coacting means between the adjacent rods to prevent rotation of one rod with respect to the other.

3. In a fishing rod, a plurality of rod sections, one rod section being reduced at its upper end, a shoulder formed at the juncture of the rod with the reduced portion, external threads formed on the rod section adjacent said shoulder and the reduced portion, the upper end of the reduced portion being tapered, a non-circular lug projecting upwardly from the outer end of the tapered portion, the superjacent rod section having a split tubular lower end portion adapted to receive the reduced portion of the first mentioned rod section, the lower end of the split tubular portion abutting the shoulder, external threads formed on the split tubular portion, said superjacent rod section having a solid portion adjacent the inner end of the split tubular portion, said solid portion being formed with a tapered socket to receive the aforesaid tapered upper end of the first mentioned rod section, the inner end of the socket being formed with a non-circular recess to receive the lug and prevent rotation of the rod sections with respect to each other, and an internally threaded locking sleeve slidably arranged on the superjacent rod section and adapted to engage the aforesaid external threads on the rod sections to lock the rod sections in assembled relation.

In testimony whereof, I affix my signature.

WALTER F. GROSSENBACH.